United States Patent
Taylor et al.

(10) Patent No.: US 11,008,526 B2
(45) Date of Patent: May 18, 2021

(54) DEMULSIFIER FOR QUATERNARY AMMONIUM SALT CONTAINING FUELS

(71) Applicant: Afton Chemical Corporation, Richmond, VA (US)

(72) Inventors: Daniel Taylor, Fredericksburg, VA (US); Makaye Tabibi, Richmond, VA (US)

(73) Assignees: Croda Inc., Edison, NJ (US); AFTON CHEMICAL CORPORATION, Richmond, VA (US)

( * ) Notice: Subject to any disclaimer, the term of this patent is extended or adjusted under 35 U.S.C. 154(b) by 16 days.

(21) Appl. No.: 16/519,910

(22) Filed: Jul. 23, 2019

(65) Prior Publication Data

US 2021/0024844 A1  Jan. 28, 2021

(51) Int. Cl.
| | | |
|---|---|---|
| *C10L 1/22* | (2006.01) | |
| *C10L 10/18* | (2006.01) | |
| *C10L 1/06* | (2006.01) | |
| *C10L 1/08* | (2006.01) | |
| *C10L 1/18* | (2006.01) | |
| *C10L 1/14* | (2006.01) | |
| *C10L 1/222* | (2006.01) | |
| *C10L 1/2383* | (2006.01) | |
| *C10L 1/198* | (2006.01) | |

(52) U.S. Cl.
CPC ............ *C10L 1/22* (2013.01); *C10L 1/06* (2013.01); *C10L 1/08* (2013.01); *C10L 1/143* (2013.01); *C10L 1/146* (2013.01); *C10L 1/18* (2013.01); *C10L 10/18* (2013.01); *C10L 1/1981* (2013.01); *C10L 1/2222* (2013.01); *C10L 1/2383* (2013.01); *C10L 2200/0423* (2013.01); *C10L 2200/0446* (2013.01); *C10L 2270/023* (2013.01); *C10L 2270/026* (2013.01)

(58) Field of Classification Search
CPC combination set(s) only.
See application file for complete search history.

(56) References Cited

U.S. PATENT DOCUMENTS

| | | | |
|---|---|---|---|
| 3,907,701 A | 9/1975 | Liebold et al. | |
| 4,171,959 A | 10/1979 | Vartanian | |
| 4,209,422 A | 6/1980 | Zimmerman et al. | |
| 4,248,719 A | 2/1981 | Chafetz | |
| 5,254,138 A | 10/1993 | Kurek | |
| 7,285,519 B2 | 10/2007 | Cox et al. | |
| 8,153,570 B2 | 4/2012 | Barton | |
| 8,529,643 B2 | 9/2013 | Galante-Fox et al. | |
| 8,690,970 B2 | 4/2014 | Fang | |
| 8,768,650 B2 | 7/2014 | Delbridge | |
| 8,863,700 B2 | 10/2014 | Fang et al. | |
| 8,894,726 B2 | 11/2014 | Fang et al. | |
| 8,915,977 B2 | 12/2014 | Fang et al. | |
| 8,974,551 B1 | 3/2015 | Fang et al. | |
| 8,992,636 B1 | 3/2015 | Fang et al. | |
| 9,017,431 B2 | 4/2015 | Fang et al. | |
| 9,200,226 B1 | 12/2015 | Fang | |
| 9,222,046 B2 | 12/2015 | Fang et al. | |
| 9,340,742 B1 | 5/2016 | Fang et al. | |
| 9,458,400 B2 | 10/2016 | Fang | |
| 9,574,149 B2 | 2/2017 | Fang et al. | |
| 9,677,020 B2 | 6/2017 | Fang et al. | |
| 9,695,366 B2 | 7/2017 | Bevinakatti et al. | |
| 9,951,285 B2 | 4/2018 | Roeger-Goepfert | |
| 10,125,326 B2 | 11/2018 | Rouse et al. | |
| 10,174,269 B2 | 1/2019 | Boehnke | |
| 10,308,888 B1 | 6/2019 | Schwab | |
| 2011/0258917 A1* | 10/2011 | Garcia Castro | C10L 10/08 44/404 |
| 2012/0138004 A1 | 6/2012 | Stevenson | |
| 2013/0166828 A1 | 2/2013 | Reid | |
| 2013/0104826 A1 | 5/2013 | Burgess | |
| 2014/0157656 A1 | 6/2014 | Reid | |
| 2014/0174390 A1 | 6/2014 | Reid | |
| 2014/0318486 A1* | 10/2014 | Fang | C07C 53/06 123/1 A |
| 2015/0232774 A1 | 8/2015 | Fang et al. | |
| 2015/0252278 A1 | 9/2015 | Bush | |
| 2016/0130514 A1 | 5/2016 | Hansch | |

(Continued)

FOREIGN PATENT DOCUMENTS

| | | |
|---|---|---|
| EP | 2531580 | 11/2017 |
| WO | 1993014178 A1 | 7/1993 |
| WO | 2015177508 A1 | 11/2015 |
| WO | 2015184276 A1 | 12/2015 |

OTHER PUBLICATIONS

Shanahan, Charles S. et al. "A General Method for fouling Injectors in Gasoline Direct Injection Vehicles and the Effects for Deposits on Vehicle Performance," SAE Int. J. Fuels Lubr. 10(3)2017, doi: 10.4271/2017-01-2298.

Eureopean Search Report, dated Dec. 17, 2020, for EP Application No. 20185374.4.

*Primary Examiner* — Ellen M McAvoy
*Assistant Examiner* — Chantel L Graham
(74) *Attorney, Agent, or Firm* — Honigman LLP

(57) ABSTRACT

Described herein are fuel performance additives, fuels including such additive, methods of improving the demulsiliblity of fuels using fuel performance additives, and the use of a fuel performance additive to improve the demulsiliblity of fuel where such fuels are gasoline or diesel and further include a quaternary ammonium salt obtained from at least the reaction of a nitrogen containing compound having at least a tertiary amino group and a quaternizing agent.

26 Claims, No Drawings

(56) References Cited

U.S. PATENT DOCUMENTS

| | | |
|---|---|---|
| 2016/0152910 A1 | 6/2016 | Reid |
| 2016/0152912 A1 | 6/2016 | Mulqueen |
| 2017/0096610 A1 | 4/2017 | Bush |
| 2017/0096611 A1 | 4/2017 | Stevenson |
| 2017/0101594 A1 | 4/2017 | Stevenson |
| 2017/0107438 A1 | 4/2017 | Greenfield |
| 2017/0114296 A1 | 4/2017 | Arters |
| 2017/0114297 A1 | 4/2017 | Sampler |
| 2017/0121628 A1 | 5/2017 | Moreton |
| 2017/0166826 A1 | 6/2017 | Culley |
| 2017/0218291 A1 | 8/2017 | Reid |
| 2018/0066202 A1 | 3/2018 | Gahagan |
| 2018/0223203 A1 | 8/2018 | Cook |
| 2020/0230523 A1* | 7/2020 | Oliveira Filho ....... C09K 8/588 |

* cited by examiner

DEMULSIFIER FOR QUATERNARY AMMONIUM SALT CONTAINING FUELS

TECHNICAL FIELD

This disclosure is directed to fuel additive compositions that include polymeric blends suitable for demulsification of fuels including quaternary ammonium salts.

BACKGROUND

Diesel and gasoline fuel often contain small amounts of water, typically from a few ppm up to several percent by weight. Such water may be the result of, for instance, condensation into the fuel while in tanks and pipelines during transport and storage. The amount of water may separate as a layer at the bottom of the storage tank and/or may be emulsified in the fuel. The presence of water is undesired as it can cause problems during transport and/or during use in combustion.

Water is separated from fuels typically through the use of various agents that demulsify or break the water-fuel emulsion in order to separate the water as a distinct layer in the fuel that can be removed by various applications. However, many common fuel additives tend to hinder or even limit the functionality of the conventional demulsification agents. Quaternary ammonium salts, for instance, are one such additive category commonly used in gasoline and diesel fuels as a detergent. A shortcoming of quaternary ammonium salts in the presence of conventional demulsification additives, however, is that such salts tend to have a negative effect on fuel demulsibility rendering it more difficult to separate and remove water from the fuel in tanks and transport lines.

SUMMARY

In one aspect, a fuel performance additive including a quaternary ammonium salt obtained from the reaction of a nitrogen containing compound having at least a tertiary amino group and a quaternizing agent and a demulsifier component is described herein. In one approach, the demulsifier component includes a blend of (i) at least two alkoxylated phenol formaldehyde polymers, the first alkoxylated phenol formaldehyde polymer having a relative solubility number of 18 to 22 and the second alkoxylated phenol formaldehyde polymer having a relative solubility number of 12 to 16; (ii) an alkoxylated fatty acid polymer having a relative solubility number of 12 to 16 (iii) an alkoxylated polyimine polymer having a relative solubility number of less than 10.

In another aspect, approaches or embodiments of the fuel performance additive of the previous paragraph may be combined with other optional features in any combination. These optional features or embodiments may include one or more of the following: wherein the first alkoxylated phenol formaldehyde polymer is an ethoxylated phenol formaldehyde polymer having about 25 to about 75 moles of ethylene oxide; and/or wherein the second alkoxylated phenol formaldehyde polymer is an ethoxylated and propoxylated phenol formaldehyde polymer having about 5 to 30 moles of ethylene oxide and propylene oxide combined; and/or wherein the alkoxylated fatty acid polymer is derived from a dimer fatty diacid, a trimer fatty triacid, a dimer fatty diol and/or a trimer fatty triol and at least one alkylene oxide derived group and has about 5 to about 30 total moles of alkoxylation; and/or wherein the alkoxylated polyimine has about 10 to about 50 moles of alkoxylation; and/or wherein the demulsifier component includes a blend of about 10 to about 50 weight percent of the first alkoxylated phenol formaldehyde, about 10 to about 50 weight percent of the second alkoxylated phenol formaldehyde polymer, about 10 to about 50 weight percent of the alkoxylated fatty acid polymer, and about 1 to about 15 weight percent of the alkoxylated polyimine; and/or further including a weight ratio of the quaternary ammonium salt to the demulsifier component of about 5:1 to about 1:1; and/or further including about 45 to about 190 total moles of alkoxylation provided by the blend of (i), (ii), and (iii); and/or wherein the nitrogen containing compound of the quaternary ammonium salt is the reaction product of a hydrocarbyl-substituted acylating agent and a compound having an oxygen or nitrogen atom capable of condensing with the hydrocarbyl-substituted acylating agent and including the tertiary amino group; and/or wherein the nitrogen containing compound is a polyamine including the tertiary amino group and a primary amine, a secondary amine, or combinations thereof; and/or wherein the hydrocarbyl-substituted acylating agent is a hydrocarbyl substituted succinic acid, ester, anhydride, mono-acid/mono-ester, or diacid; and/or wherein the quaternizing agent is selected from the group consisting of hydrocarbyl substituted carboxylates, carbonates, cyclic carbonates, phenates, epoxides, carbamates, halides, sulfates, sulfites, sulfides, sulfonates, phosphates, phosphonates, salicylates, oxalates, or mixtures thereof; and/or wherein the quaternary ammonium salt is a hydrocarbyl soluble quaternary ammonium carboxylate derived from a reaction of a quaternary ammonium carbonate with an organic acid; and/or wherein the quaternary ammonium carbonate is formed by reacting a carbonic acid diester with a tertiary amido amine compound; and/or wherein the quaternary ammonium carbonate is selected from the group consisting of succinimidoalkyl trialkyl ammonium carbonates, succinamido/succinyl ester ammonium carbonates and amidoalkyl trialkyl ammonium carbonates; and/or wherein the organic acid is selected from the group consisting of stearic acid, nonadecanoic acid, arachidic acid, tuberculostearic acid, tuzuic acid, petroselinic acid, oleic acid, elaidic acid, vaccenic acid, gadoleic acid, polyalkyl or polyalkenyl succinic ester acid, amide acid, imide acid, hexadecane diacid, heptadecane diacid, octadecane diacid, noncadecane diacid, eicosane diacid, 3-hexyl-4-decene-1,2-dicarboxylic acid, 3-hexyl-1,12-decanedicarboxylic acid, 6-ethylene-9-hexadecene-1,15-dicarboxylic acid, 6-ethyl-1,16-hexadecanedicarboxylic acid, 6-phenyl-1,12-dodecane dicarboxylic acid, 7,12-dimeth-y-7,1-octadecanediene-1,18-dicarboxylic acid, 7,12-dimeth-yl-1,18-octadecanedicarboxylic acid, 6,8-diphenyl-1,14-tetradecane dicarboxylic acid, and polyalkyl or polyalkenyl succinic diacids; and/or wherein the quaternary ammonium salt is derived from an amido amine containing at least one tertiary amino group and an epoxide in the presence of a proton donor selected from a carboxylic acid and an alkyl phenol; and/or wherein the amido amine is in a reaction medium substantially devoid of an acylating agent; and/or wherein the proton donor is a carboxylic acid selected from the group consisting of fatty acids, formic acid, acetic acid, propionic acid, butyric acid, polyisobutenyl succinic acid, amide/acid, or acid/ester, and polymeric acids, and mixtures thereof.

In another aspect or embodiment, a fuel composition including a major amount of a fuel and a fuel performance, additive as described in any of the two preceding paragraphs or embodiments. In some approaches, the fuel is selected from gasoline or diesel.

In yet another aspect or embodiment, a method of improving the demulsibility of an additive-containing fuel and/or the use of a demulsifier component to improve the demulsibility of a fuel is provided herein. In some approaches, the method or use includes combining a major amount of fuel with a quaternary ammonium salt fuel performance additive and a demulsifier component including a blend of (i) at least two alkoxylated phenol formaldehyde polymers, the first alkoxylated phenol formaldehyde polymer having a relative solubility number of 18 to 22 and the second alkoxylated phenol formaldehyde polymer having a relative solubility number of 12 to 16; (ii) an alkoxylated fatty acid polymer having a relative solubility number of 12 to 16 (iii) an alkoxylated polyimine polymer having a relative solubility number of less than 10. In some optional approaches or embodiments, the fuel is selected from gasoline or diesel; and/or wherein the improved demulsibility is measured per ASTM D1094, ASTM D7451, and the like methods.

DETAILED DESCRIPTION

Described herein are fuel performance additives, fuels including such additive, methods of improving the demulsibility of fuels using fuel performance additives, and the use of a fuel performance additive to improve the demulsibility of fuel where such fuels are gasoline or diesel and further include a quaternary ammonium salt obtained from at least the reaction of a nitrogen containing compound having at least a tertiary amino group and a quaternizing agent. In one aspect, the fuel performance additives herein include the quaternary ammonium salt combined with a unique demulsifier component including a blend or mixture of (i) at least two alkoxylated phenol formaldehyde polymers in which the first alkoxylated phenol formaldehyde polymer has a relative solubility number of 18 to 22 and the second alkoxylated phenol formaldehyde polymer has a relative solubility number of 12 to 16, (ii) an alkoxylated fatty acid polymer having a relative solubility number of 12 to 16, and (iii) an alkoxylated polyimine polymer having a relative solubility number of less than 10. This novel blend of polymers unexpectedly achieves superior separation and demulsification of water from gasoline or diesel fuels that also includes a quaternary ammonium salt known to be detrimental to demulsification.

Alkoxylated Phenol Formaldehyde Polymers

In one approach, the demulsifier component of the fuel performance additives herein includes at least two separate or distinct alkoxylated phenol formaldehyde polymers. Suitable alkoxylated phenol formaldehyde polymers may be obtained from a variety of sources and, while not wishing to be limited by theory, are believed to include alkyl phenol formaldehyde alkoxylates as described below and include ethylene oxide and/or propylene oxide derived alkoxylation and, in some approaches, may have a molecular weight of about 1,000 to about 5,000 g/mol. In other approaches, the alkoxylated phenol formaldehyde polymers may be dissolved in or provided within a solvent, such as aromatic solvents like C6 to C10 aromatic hydrocarbons.

In another approach, each of the first and second alkoxylated phenol formaldehyde polymers of the fuel performance additive may have a general structure of

(R$_1$)$_p$—PH—(CH$_2$)$_m$—C(O)O-(AO)$_n$—R$_2$     (Formula I)

wherein PH is a phenyl group optionally substituted with R1 groups where each R1 is independently a C1 to C4 alkyl or alkoxy group; R2 is a C1 to C10 linear or branched alkyl group (in some approaches, a C1 to C6 alkyl group, and in yet other approaches, a C3 to C5 alkyl group); AO is an alkylene oxide derived group, such as an ethylene oxide, a propylene oxide-derived group, or combinations thereof, that may vary along the (poly)alkyleneoxy chain. In Formula I, n is an integer that may range from 1 to 100 effective to provide the desired relative solubility number for the polymer; m may be an integer of 1 or 2; and p is an integer of 0, 1 or 2. In some approaches, R2 is a branched alkyl group such as a secondary alkyl group selected from iso-propyl (prop-2-yl), sec-butyl (but-2-yl), iso-butyl (2-methyl-prop1-yl) and/or tert-butyl group, or a 2-ethyl hexyl group, and the like, and combinations thereof.

In yet another approach, the alkoxylated phenol formaldehyde resins herein may include a total of about 30 to about 110 moles of alkoxylation between the two separate polymers included within the fuel performance additive. In some instances, the first alkoxylated phenol formaldehyde polymer used in the fuel performance additive may have about 25 to about 75 moles of alkoxylation provided by, in some approaches, ethylene oxide. In other instances, the other or second alkoxylated phenol formaldehyde polymer used in the fuel performance additive may include about 5 to about 35 moles of alkoxylation provided by, in some approaches, both ethylene oxide and propylene oxide randomly within the alkoxylation moiety.

In some approaches, a fuel performance additive (and any fuel including such additive) may also have a ratio of the first alkoxylated phenol formaldehyde polymer to the second phenol formaldehyde polymer of about 0.5:1 to about 1.75:1 or, in some approaches, about 1:1. In other approaches, the demulsifier blend may include about 0.05 to about 50 weight percent of the first alkoxylated phenol formaldehyde polymer, in other approaches, about 5 to about 40 weight percent, and in yet further approaches, about 10 to about 30 weight percent. The demulsifier blend may also include about 0.05 to about 50 weight percent of the second alkoxylated phenol formaldehyde polymer, in other approaches, about 5 to about 40 weight percent, and in yet further approaches, about 10 to about 30 weight percent.

The alkoxylation of such polymers is selected to achieve relative solubility numbers of each polymer suitable for unique additive blend herein to achieve the demulsification in the context of quaternary ammonium salt containing fuels. Relative solubility number is known to those of skill as a measure of the solubility of a polymer and corresponds to the hydrophobic-lipophilic balance of the molecule. The relative solubility number may be determined by a titration against water of the polymer in a solvent system including xylene, diethylene glycol monobutyl ether and dimethyl isosorbide. In general, a relative solubility number less than about 13 generally indicates the polymer is more oil soluble whereas a number greater than about 18 generally indicates the polymer is more water soluble with values in between suggesting the polymer is dispersible. Further information on determining the relative solubility number may be obtained in Wu et al, Colloids and surfaces: Physicochemical and engineering aspects; 2004; Vol. 232(2-3); pages 229-237, which is incorporated herein by reference.

As used herein, relative solubility number is determined by titration against water of 1 gram of a polymer in 30 grams of solvent (5 weight percent xylene, 20 weight percent diethylene glycol monobutyl ether, and 75 weight percent dimethyl isosorbide). The end point of the titration is when a persistent turbidity holds for at least one minute and the volume of water in milliliters used in the titration is the relative solubility number.

In one approach, the first alkoxylated phenol formaldehyde polymer may have a relative solubility number of about 18 or greater, and in other approaches, about 18 to about 22. The second alkoxylated phenol formaldehyde polymer may have a lower relative solubility than the first alkoxylated phenol formaldehyde polymer and, in some approaches, a relative solubility number of about 16 or less, and in other approaches, about 12 to about 16.

In some approaches, each of the first and second alkoxylated phenol formaldehyde polymers are provided in a solvent. Suitable solvents may be aromatic solvents, such as C6 to C10 aromatic solvents such as trimethyl benzenes, diethyl benzenes, dimethylethyl benzenes, and the like, and combinations thereof. In some approaches or embodiments, a concentration of each polymer in solvent may be about 10 to about 90%, about 15 to about 85%, or about 25 to about 80% by weight of the total formulation. Correspondingly, each polymer composition will then typically include about 90% to about 10%, about 85% to about 15%, or about 75% to about 20% of the solvent.

Alkoxylated Fatty Acid Polymer

In another approach, the demulsifier component of the fuel performance additives herein also includes an alkoxylated fatty acid polymer derived from a dimer fatty diacid, a trimer fatty triacid, a dimer fatty diol and/or a trimer fatty triol and at least one alkyleneoxy chain (that is, a sequence of alkylene oxide derived groups). Suitable alkoxylated fatty acids polymers may also be obtained from a variety of sources, and in some approaches, are believed to include a fatty acid derived base moiety as described below combined with one or more alkoxylation blocks having a first ethylene oxide moiety, a propylene oxide moiety, and then a second ethylene oxide moiety.

In some approaches, the alkoxylated fatty acid polymer may have a structure of Formula II:

  (Formula II)

wherein $R_3$ is a residue of one or more of a dimer fatty diacid, a trimer fatty triacid, a dimer fatty diol and/or a trimer fatty triol; $R_4$ is H or $(CO)_xR_5$ where x is an integer of 0 or 1 and $R_5$ is a $C_1$ to $C_6$ aliphatic hydrocarbyl group; EO is an ethylene oxide derived group; PO is a propylene oxide derived group; p is an integer from 1 to 20; q is an integer from 1 to 20; r is an integer from 1 to 20. In Formula II, n is an integer representing the average number of total alkylene oxide derived groups and n may be from 1 to 3. If R3 is a dimer residue, then R3 may have up to two alkylene oxide derived chains attached to it, and if R3 is a trimer residue, then R3 may have up to 3 alkylene oxide chains attached to it.

In Formula II and in some approaches, the total number of ethylene oxide derived groups is represented by p+r, is believed to be an integer from 2 to 40, 4 to 36, or 6 to 30. Likewise, the total number of alkylene oxide derived groups (EO, PO, and minor others) may be represented by p+q+r, which is an integer ranging from at least 3, at least 6, or at least 9 to at most 60, at most 51, or at most 45. In other approaches, a ratio of ethylene oxide derived groups to propylene oxide derived groups may be represented by a ratio of (p+r)/q, which may be about 0.5 to about 8, about 0.5 to about 6, about 1 to about 4, about 1.5 to about 2.5. In yet other approaches, a relative length of the first EO segment to the PO segment to the second EO segment may be given by the ratio of p to q to r. In some embodiments, this length ratio may be 0.5 to 2:0.5 to 2:0.5 to 2, or 0.75 to 1.5:0.75 to 1.5:0.75 to 1.5, or 0.8 to 1.2:0.8 to 1.2:0.8 to 1.2. In yet further optional approaches, a weight ratio of the fatty acid moiety of R3 to total alkylene oxide derived groups may range from at least 0.1:1 or at least 0.2:1 to at most 1:1, at most 0.8:1, or at most 0.6:1.

As understood by those of skill, a residue refers to a portion of a reactant molecule which remains in the reaction product after the reaction has occurred. Herein, a dimer fatty diacid (also referred to as dimer fatty acid) refers to the dimerisation products of mono- or polyunsaturated fatty acids and/or esters. Due to the carboxylic acid group on each individual fatty acid (monomer), a dimer fatty diacid comprises two carboxylic acid groups. Likewise, a trimer fatty triacid (or trimer fatty acid) refers to trimerisation products of mono- or polyunsaturated fatty acids and/or esters. In some optional approaches, a weight ratio of di-functional material or residues thereof (dimer fatty diacid and/or dimer fatty diol) to tri-functional material (trimer fatty triacid and/or trimer fatty triol) may be from about 20:1 to about 0.2:1, in other approaches, from about 5:1 to about 0.2:1, and in yet other approaches, about 4:1 to about 0.5:1. For example, R3 may include a mixture of dimer fatty diacid residues and trimer fatty triacid residues.

The dimer fatty diacids or dimer fatty residues, in some approaches, are derived from the dimerisation products of C10 to C30 fatty acids, in other approaches, C12 to C24 fatty acids, in yet further approaches, C14 to C22 fatty acids, in other approaches, C16 to C20 fatty acids, and in some instances, C18 fatty acids. Thus, the resulting dimer fatty diacids may include carbon atoms in the range from 20 to 60, 24 to 48, 28 to 44, 32 to 40, and in some instances, 36 carbon atoms. The fatty acids, from which the dimer fatty diacids are derived, may be selected from linear or branched unsaturated fatty acids. The unsaturated fatty acids may be selected from fatty acids having either a cis/trans configuration, and may have one or more than one unsaturated double bonds.

In some approaches, the fatty acids used are linear mono-unsaturated fatty acids. Suitable dimer fatty diacids may be derived from the dimerisation products of oleic acid, linoleic acid, linolenic acid, palmitoleic acid, or elaidic acid. In other approaches, the dimer fatty diacids may be dimerisation products of unsaturated fatty acid mixtures obtained from the hydrolysis of natural fats and oils, e.g. sunflower oil, soybean oil, olive oil, rapeseed oil, cottonseed oil, or tall oil. The weight average molecular weight of the dimer fatty diacid may be about 450 to about 690, about 500 to about 640, about 530 to about 610, or about 550 to about 590. In some approaches, the dimer fatty acid may include less than about 10 weight percent, less than about 6 weight percent, or less than about 4 weight percent of mono fatty monoacid (or monomer). In other approaches, the dimer fatty residues may be hydrogenated or may be non-hydrogenated.

If used, the trimer fatty triacids may be derived from the trimerisation products of the sources mentioned above with regard to the dimer fatty acids. Thus, the trimer fatty triacids may contain 30 to 90, 36 to 72, 42 to 66, 48 to 60, or 54 carbon atoms. In some approaches, R3 is a residue of at least one of or more of a dimer fatty diacid having from 24 to 48 carbon atoms, a trimer fatty triacid having from 36 to 72 carbon atoms, a dimer fatty diol having from 24 to 48 carbon atoms and/or a trimer fatty triol having from 36 to 72 carbon atoms. If used, the weight average molecular weight of the trimer fatty triacids may be about 750 to about 950, about 790 to about 910, about 810 to about 890, or about 830 to about 870.

A dimer fatty diacid or trimer fatty diacid may be converted to a dimer or trimer fatty diol as needed for particular application. For example, a dimer fatty diol may be formed by hydrogenation of the corresponding dimer fatty diacid. In such instance, a dimer or trimer fatty diol may have properties as described herein with regard to the associated dimer or trimer fatty diacid except that the acid groups in the dimer or trimer fatty diacid are replaced with hydroxyl groups. The dimer or trimer fatty diol may be hydrogenated or non-hydrogenated.

In some approaches, the ethylene oxide moieties and the propylene oxide moieties may also contain minor proportions of other alkylene oxide groups. For example, the alkylene oxide section may include minor proportions of butylene oxide groups. The minor proportion of such other alkylene oxide units may not be more than about 10 mol percent and is usually not more than about 5 mol percent of the total alkylene oxide groups in the respective section.

The alkoxylated fatty acid polyol may have a number average molecular weight ranging from at least about 500 g/mol, at least about 800 g/mol, at least about 1,000 g/mol, or at least about 1,500 g/mol to at most about 20,000 g/mol, at most about 10,000 g/mol, at most about 5,000 g/mol, or at most about 4,000 g/mol. The alkoxylated fatty acid polyol may also have a weight average molecular weight ranging from at least about 500 g/mol, at least about 1,000 g/mol, at least about 1,500 g/mol, at least about 2,000 g/mol, or at least about 2,500 g/mol to at most about 20,000 g/mol, at most about 15,000 g/mol, at most about 10,000 g/mol, or at most about 8,000 g/mol. The molecular weight may be determined by gel permeation chromatography.

In other approaches, the demulsifier blend herein may include about 0.05 to about 50 weight percent of the alkoxylated fatty acid polymer, in other approaches, about 5 to about 40 weight percent, and in yet further approaches, about 10 to about 30 weight percent. In other embodiments or approaches, the alkoxylated fatty acid polymers herein may also include a total of about 5 to about 30 moles of alkoxylation provided by, for example, the ethylene oxide derived moieties and the propylene oxide derived moieties. In one approach, the alkoxylated fatty acid polymers herein may also have a relative solubility number of about 12 to about 16. The alkoxylation of such polymers is selected to achieve relative solubility numbers of each polymer suitable for unique additive blend herein to achieve the demulsification in the context of quaternary ammonium salt containing fuels. The relative solubility number is determined as discussed above.

As with the alkoxylated phenol formaldehyde polymers above, the alkoxylated fatty acid polymers herein may also include a solvent selected from toluene, xylene, heavy or light aromatic naphtha, diesel, isopropyl alcohol, methanol, 2-ethyl hexanol, butyl glycol ether, butyl di-glycol, mono ethylene glycol and mixtures thereof. In some approaches, the solvent may be present with the polymer at a concentration ranging from at least about 5 weight percent based on the total weight of the polymer, at least about 10 weight percent, at least about 20 weight percent, or at least about 30 weight percent, to at most about 90 weight percent based on the total weight of the demulsifier, at most 80 weight percent, or at most 70 weight percent.

Alkoxylated Polyimine

In yet other approaches, the demulsifier component of the fuel performance additives herein also includes one or more alkoxylated polyimine polymers that may be obtained from a variety of sources, but are believed to include at least 10 to 50 moles of alkoxylation provided by, for instance, propylene oxide derived units and having a relative solubility number of less than 10 and, in other approaches, about 5 to about 9. Suitable alkoxylated polyimine polymers may be obtained from polyalkylene imines reacted with suitable alkylene oxide groups to achieve the desired moles of alkoxylation and solubility number. In some approaches, alkoxylation may be obtained from ethylene oxide, propylene oxide, butylene oxide, styrene oxide and cyclohexene oxide. The various alkylene oxides may be reacted with the polyalkylene polyamines either singly or together to give a block copolymerization or copolymerization type of reaction.

Demulsifier Component

The above described polymers are blended into a demulsifier component that unexpectedly achieved high demulsification functionality in fuel additives that also include quaternary ammonium salts. In one approach, the demulsifier blend includes about 10 to about 50 weight percent of the first alkoxylated phenol formaldehyde polymer, about 10 to about 50 weight percent of the second alkoxylated phenol formaldehyde polymer, about 10 to about 50 weight percent of the alkoxylated fatty acid polymer, and about 1 to about 15 weight percent of the alkoxylated polyimine polymer.

The demulsifier component includes the blend of above noted polymers and when combined in the blend provides a total of about 45 to about 190 moles of alkoxylation provided by, for instance, both ethylene oxide and propylene oxide derived groups in all polymers combined. This total level of alkoxylation is provided by the combination of at least four separate polymers in the blend. In some approaches, this blend also includes about 5 times to about 12 times more of the two alkoxylated phenol formaldehyde polymers and the alkoxylated fatty acid polymers relative to the nitrogen containing polymers.

This demulsifier blend may be added to a fuel performance additive in amounts suitable to provide demulsification in the presence of quaternary ammonium salts. In some approaches, the demulsifier blend may be about 0.1 to about 2 weight percent of the fuel performance additive and, when added to a fuel, may provide about 0.25 to about 5 ppm of the demulsifier blend to the fuel.

In some optional approaches, the fuel performance additives herein may be free of hydrocarbyl succinimide acid additives. As used herein, free of generally means less than about 1 weight percent, less than bout 0.5 weight percent, less than about 0.1 weight percent, no detectable amounts, and in other approaches, none.

In yet other approaches, the demulsifier component or blend may also be provided in an aromatic solvent, such as Aromatic 100, Aromatic 150, Aromatic 200, xylenes and combinations thereof. If used, the demulsifier component may be about 35 to about 95 weight percent of the solvent along with the above weight percent of the individual polymer components.

Quaternary Ammonium Salt

In another aspect of this disclosure, the fuel performance additives herein also include at least one quaternary ammonium salt, which is known to have a detrimental effect on fuel demulsification. Such salts may be formed through a reaction of a nitrogen containing compound having at least a one tertiary amino group and a suitable quaternizing agent. For instance, suitable quaternary ammonium salts be made by reacting a tertiary amine of Formula III

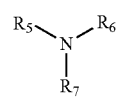

(Formula III)

wherein each of R5, R6, and R7, is selected from hydrocarbyl groups containing from 1 to 200 carbon atoms with a variety of quaternizing agents. Suitable quaternary ammonium salts may be obtained from a variety of sources and may include different amino and polyamino structures as needed for particular applications. For instance, suitable quaternary ammonium salts may be described in one or more of U.S. Pat. Nos. 8,863,700 B2; 8,894,726 B2; 8,974,551 B1; 9,574,149 B2; 8,690,970 B2; 9,340,742 B1; 9,222,046 B2; 9,200,226 B1; 8,992,636 B1; 9,017,431 B2; 8,915,977 B2; 9,4584,00 B2; and/or 9,677,020 B2 and the like patents, which are all incorporated herein by reference. The discussion below also provides examples of suitable quaternary ammonium salts, but this disclosure and fuel performance additives herein are not necessary limited to such specific quaternary ammonium salts.

In a one exemplary approach, a suitable quaternary ammonium salt is obtained from the reaction between an alkyl carboxylate and an amide or imide compound obtained by reacting a hydrocarbyl substituted acylating agent and an amine. In one approach of this aspect, the amine has the structure of Formula IV

(Formula IV)

wherein A is a hydrocarbyl linker with 2 to 10 carbon units and including one or more carbon units thereof independently replaced with a bivalent moiety selected from the group consisting of —O—, —N(R')—, —C(O)—, —C(O)O—, and —C(O)NR'. $R_8$ and $R_9$ are independently alkyl groups containing 1 to 8 carbon atoms, and R' is independently a hydrogen or a group selected from $C_{1-6}$ aliphatic, phenyl, or alkylphenyl. In another approach of this aspect, the formed quaternary ammonium salt of this aspect may be that of Formula V below.

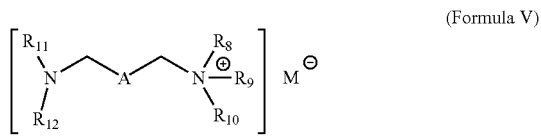

(Formula V)

wherein A is a hydrocarbyl linker with 2 to 10 carbon units and including one or more carbon units thereof independently replaced with a bivalent moiety selected from the group consisting of —O—, —N(R')—, —C(O)—, —C(O)O—, and —C(O)NR'. $R_8$, $R_9$, and $R_{10}$ are independently alkyl groups containing 1 to 8 carbon atoms; and R' is independently a hydrogen or a group selected from $C_{1-6}$ aliphatic, phenyl, or alkylphenyl. $R_{11}$ and $R_{12}$ are independently a hydrogen, an acyl group, or a hydrocarbyl substituted acyl group. If one of $R_{11}$ or $R_{12}$ is hydrogen, then the other of $R_4$ and $R_5$ is the acyl group or the hydrocarbyl substituted acyl group. If both $R_{11}$ and $R_{12}$ include carbonyl moieties, then one of $R_{11}$ and $R_{12}$ includes the acyl group and the other of $R_{11}$ and $R_{12}$ includes the hydrocarbyl substituted acyl group, and $R_{11}$ and $R_{12}$ together with the N atom to which they are attached, combine to form a ring moiety. In other approaches, $R_{11}$ and $R_{12}$ together with the N atom to which they are attached, combine to form a hydrocarbyl substituted succinimide. $M^-$ may be a carboxylate.

As used herein, the term "hydrocarbyl group" or "hydrocarbyl" is used in its ordinary sense, which is well-known to those skilled in the art. Specifically, it refers to a group having a carbon atom directly attached to the remainder of a molecule and having a predominantly hydrocarbon character. Examples of hydrocarbyl groups include: (1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); (2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, amino, alkylamino, and sulfoxy); (3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl, and imidazolyl. In general, no more than two, or as a further example, no more than one, non-hydrocarbon substituent will be present for every ten carbon atoms in the hydrocarbyl group; in some embodiments, there will be no non-hydrocarbon substituent in the hydrocarbyl group.

As used herein and throughout this disclosure, the term "major amount" is understood to mean an amount greater than or equal to 50 weight percent, for example from about 80 to about 98 weight percent relative to the total weight of the composition. Moreover, as used herein, the term "minor amount" is understood to mean an amount less than 50 weight percent relative to the total weight of the composition.

In one embodiment, the select amines of Formula IV are at least diamines or triamines having a terminal primary amino group on one end for reaction with the hydrocarbyl substituted acylating agent and a terminal tertiary amine on the other end for reaction with the quaternizing agent. In other approaches, A includes 2 to 6 carbon units with one carbon unit thereof replaced with a —O— or a —NH— group. Suitable exemplary tertiary amine for forming the fuel additives herein may be selected from 3-(2-(dimethylamino)ethoxy)propylamine, N,N-dimethyl dipropylene triamine, and mixtures thereof. In other embodiments or approaches, A has the structure —$(CH_2)_r$—[X—$(CH_2)_{r'}]_p$— with each of r, r', and p independently being an integer 1, 2, 3, or 4 and X being either oxygen or NR" with R" being hydrogen or a hydrocarbyl group. In other embodiments, X is oxygen. In yet other embodiments, X is —NH—.

The hydrocarbyl linker A preferably has 1 to 4 carbon units replaced with the bivalent moiety described above, which is preferably a —O— or a —NH— group. In other approaches, 1 to 2 carbon units of the hydrocarbyl linker A and, in yet further approaches, 1 carbon unit of the hydrocarbyl linker A is replaced with the bivalent moiety described herein. As appreciated, the remainder of the hydrocarbyl linker A is preferably a carbon atom(s). The number of carbon atoms on either side of the replaced bivalent moiety need not be equal meaning the hydrocarbyl chain between the terminal primary amino group and the terminal tertiary amino group need not be symmetrical relative to the replaced bivalent moiety.

Any of the foregoing described tertiary amines may be reacted with a hydrocarbyl substituted acylating agent that may be selected from a hydrocarbyl substituted mono- di- or polycarboxylic acid or a reactive equivalent thereof to form an amide or imide compound. A particularly suitable acylating agent is a hydrocarbyl substituted succinic acid, ester, anhydride, mono-acid/mono-ester, or diacid. In some approaches, the hydrocarbyl substituted acylating agent is a hydrocarbyl substituted dicarboxylic acid or anhydride derivative thereof, a fatty acid, or mixtures thereof.

In other approaches, the hydrocarbyl substituted acylating agent may be carboxylic acid or anhydride reactant. In one approach, the hydrocarbyl substituted acylating agent may be selected from stearic acid, oleic acid, linoleic acid, linolenic acid, palmitic acid, palmitoleic acid, lauric acid, myristic acid, myristoleic acid, capric acid, caprylic acid, arachidic acid, behenic acid, erucic acid, anhydride derivatives thereof, or a combination thereof. In one approach, the hydrocarbyl substituted acylating agent is a hydrocarbyl substituted dicarboxylic anhydride of Formula VI

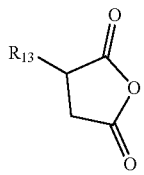

(Formula VI)

wherein $R_{13}$ is a hydrocarbyl or alkenyl group. In some aspects, $R_{13}$ is a hydrocarbyl group having a number average molecular weight from about 200 to about 2500. For example, the number average molecular weight of $R_{13}$ may range from about 600 to about 1300, as measured by GPC using polystyrene as a calibration reference. A particularly useful $R_{13}$ has a number average molecular weight of about 1000 Daltons and comprises polyisobutylene.

The number average molecular weight (Mn) for any embodiment herein may be determined with a gel permeation chromatography (GPC) instrument obtained from Waters or the like instrument and the data was processed with Waters Empower Software or the like software. The GPC instrument may be equipped with a Waters Separations Module and Waters Refractive Index detector (or the like optional equipment). The GPC operating conditions may include a guard column, 4 Agilent PLgel columns (length of 300×7.5 mm; particle size of 5μ, and pore size ranging from 100-10000 Å) with the column temperature at about 40° C. Unstabilized HPLC grade tetrahydrofuran (THF) may be used as solvent, at a flow rate of 1.0 mL/min. The GPC instrument may be calibrated with commercially available polystyrene (PS) standards having a narrow molecular weight distribution ranging from 500-380,000 g/mol. The calibration curve can be extrapolated for samples having a mass less than 500 g/mol. Samples and PS standards can be in dissolved in THF and prepared at concentration of 0.1-0.5 wt. % and used without filtration. GPC measurements are also described in U.S. Pat. No. 5,266,223, which is incorporated herein by reference. The GPC method additionally provides molecular weight distribution information; see, for example, W. W. Yau, J. J. Kirkland and D. D. Bly, "Modern Size Exclusion Liquid Chromatography", John Wiley and Sons, New York, 1979, also incorporated herein by reference.

In some approaches, the $R_{13}$ hydrocarbyl moiety may comprise one or more polymer units chosen from linear or branched alkenyl units. In some aspects, the alkenyl units may have from about 2 to about 10 carbon atoms. For example, the polyalkenyl radical may comprise one or more linear or branched polymer units formed from ethylene radicals, propylene radicals, butylene radicals, pentene radicals, hexene radicals, octene radicals and decene radicals. In some aspects, the $R_6$ polyalkenyl radical may be in the form of, for example, a homopolymer, copolymer or terpolymer. In other aspects, the polyalkenyl radical is polyisobutylene. For example, the polyalkenyl radical may be a homopolymer of polyisobutylene comprising from about 5 to about 60 isobutylene groups, such as from about 15 to about 30 isobutylene groups. The polyalkenyl compounds used to form the $R_{13}$ polyalkenyl radicals may be formed by any suitable methods, such as by conventional catalytic oligomerization of alkenes.

In some aspects, high reactivity polyisobutylenes having relatively high proportions of polymer molecules with a terminal vinylidene group may be used to form the $R_{13}$ group. In one example, at least about 60%, such as about 70% to about 90%, of the polyisobutenes comprise terminal olefinic double bonds. In some aspects, approximately one mole of maleic anhydride may be reacted per mole of polyalkylene, such that the resulting polyalkenyl succinic anhydride has about 0.8 to about 1.5 succinic anhydride group per polyalkylene substituent. In other aspects, the molar ratio of succinic anhydride groups to polyalkylene groups may range from about 0.5 to about 3.5, such as from about 1 to about 1.3.

A suitable alkylating or quaternizing agent for this aspect may be a hydrocarbyl-substituted carboxylate, such as an alkyl carboxylate. In some approaches or embodiments, the quaternizing agent is an alkyl carboxylate selected form alkyl oxalate, alkyl salicylate, and combinations thereof. In other approaches or embodiments, the alkyl group of the alkyl carboxylate includes 1 to 6 carbon atoms, and is preferably methyl groups. For alkylation with an alkyl carboxylate, it may be desirable in some approaches that the corresponding acid of the carboxylate have a pKa of less than 4.2. For example, the corresponding acid of the carboxylate may have a pKa of less than 3.8, such as less than 3.5, with a pKa of less than 3.1 being particularly desirable. Examples of suitable carboxylates may include, but not limited to, maleate, citrate, fumarate, phthalate, 1,2,4-benzenetricarboxylate, 1,2,4,5-benzenetetra carboxylate, nitrobenzoate, nicotinate, oxalate, aminoacetate, and salicylate. As noted above, preferred carboxylates include oxalate, salicylate, and combinations thereof.

For example, any embodiments of the fuels of this disclosure may contain, on an active ingredient basis, an amount of the quaternary ammonium salt (or reaction product as described herein) in the range of about 1 ppm to about 100 ppm, in other approaches, about 5 ppm, to about 50 ppm, in yet further approaches about 10 ppm to about 25 ppm of the quaternary ammonium salt. It will also be appreciated that any endpoint between the above described ranges are also suitable range amounts as needed for a particular application. The active ingredient basis excludes the weight of (i) unreacted components associated with and remaining in the product as produced and used, and (ii) solvent(s), if any, used in the manufacture of the product either during or after its formation.

In a second exemplary approach, another suitable quaternary ammonium salt may be made by reacting the tertiary amine of the formula IV above with a dialkyl carbonate and subsequently reacting the resulting quaternary ammonium carbonate with an acid or phenol to provide a hydrocarbyl soluble quaternary ammonium carboxylate or phenate respectively. The quaternary ammonium carbonate may also be derived from a tertiary amido amine and a dialkyl carbonate.

In one embodiment, a tertiary amine including diamines and polyamines may be reacted with a $C_1$ to $C_{54}$ carboxylic acid to form an amido amine and the amido amine may be subsequently reacted with a quaternizing agent. Suitable tertiary amido amine compounds may have a hydrocarbyl linkage, such as an ether linkage between the amido group and the amino group or the tertiary amido amine may be a compound of the Formula VII

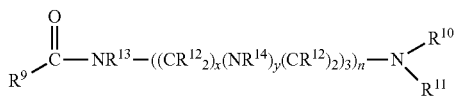

(Formula VII)

wherein each of $R^{10}$, and $R^{11}$ of Formula VII is selected from hydrocarbyl groups containing from 1 to 200 carbon atoms, each $R^9$, $R^{12}$, $R^{13}$ and $R^{14}$ of Formula VII may be independently selected from hydrogen or a hydrocarbyl group, x of Formula VII may range from 1 to 6, y may be 0 or 1, z may be 1 to 6, and n may range from 1 to 6. Each hydrocarbyl group $R^9$ to $R^{14}$ of Formula VII may independently be linear, branched, substituted, cyclic, saturated, unsaturated, or contain one or more hetero atoms. Suitable hydrocarbyl groups may include, but are not limited to alkyl groups, aryl groups, alkylaryl groups, arylalkyl groups, alkoxy groups, aryloxy groups, amino groups, and the like. Particularly suitable hydrocarbyl groups may be linear or branched alkyl groups. A representative example of an amine reactant which may be amidized and quaternized to yield compounds disclosed herein include for example, but are not limited to, dimethyl amino propyl amine and 2-(2-dimethylamino-ethoxy)ethylamine.

If the amine contains solely primary or secondary amino groups, it may be desirable to alkylate at least one of the primary or secondary amino groups to a tertiary amino group prior to quaternizing. In one embodiment, alkylation of primary amines and secondary amines or mixtures with tertiary amines may be exhaustively or partially alkylated to a tertiary amine, and then converted into a quaternary ammonium carbonate salt.

When the amine has a hydroxyl group, the amine may be converted to an ester amine by reacting the amine with a C1 to C54 carboxylic acid. The acid may be a monoacid, a dimer acid, or a trimer acid. The acid may be selected from the group consisting of formic acid, acetic acid, propionic acid, butyric acid, caprylic acid, capric acid, lauric acid, myristic acid, palmitic acid, stearic, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, .alpha.-linolenic acid, arachidonic acid, eicosapentaenoic acid, erucic acid, docosa hexaenoic acid, and the dimer and trimer acids thereof. When reacted with the amine, the reaction product may be a $C_1$-$C_{54}$-alkyl or alkenyl-substituted ester amine such as a $C_1$-$C_{54}$-alkyl or alkenyl-substituted ester propyldimethylamine.

Suitable quaternizing agents for this second quaternary ammonium salt example may be selected from a carbonic acid diester, such as dimethyl carbonate, ethylmethyl carbonate, diethyl carbonate, di-propyl carbonate, dibutyl carbonate, cyclic carbonates, and the like. A particularly suitable carbonic acid diester may be selected from dimethyl carbonate and diethylcarbonate. The reaction between the tertiary amine and carbonate may be carried out by contacting and mixing the amine with the carbonate in the reaction vessel in the substantial absence of acid or protonating agent.

The reaction may be carried out at temperature ranging from about 100° to about 200° C., for example from about 110 to about 170° C. The reaction may be conducted by reacting any amount of tertiary amino groups to carbonate groups sufficient to provide a quaternary ammonium compound. In one embodiment a mole ratio of tertiary amino groups to carbonate may range from 2:1 to about 1:5, or from 1:1 to 1:2, or from 1:1 to 1:1.5. The reaction may optionally be conducted in the presence of alcohol or water and excess of dialkyl carbonate. Contrary to the prior art teaching it was surprisingly found that for certain amido amines, a high yield of quaternary ammonium salt may be achieved by reacting in the absence of alcohol or water solvents and limited amounts of dialkyl carbonate. When the reaction is completed volatiles and unreacted reagents may be removed from the reaction product by heating the reaction product under vacuum. The product may be diluted with mineral oil, diesel fuel, kerosene, alcohol, or an inert hydrocarbon solvent to prevent the product from being too viscous, if necessary.

The resulting quaternary ammonium carbonate compound is then reacted with an organic acid or phenol to provide the hydrocarbyl soluble quaternary ammonium carboxylate or phenate. In some approaches, suitable organic acids have a molecular weight of at least 282 g/mol. In other approaches, examples of the organic acid may be aliphatic, alkenyl or aromatic monocarboxylic acids such as formic acid, acetic acid, propionic acid, butyric acid, valeric acid, caproic acid, enanthic acid, caprylic acid, pelargonic acid, capric acid, undecanic acid, lauric acid, tridecanic acid, myristic acid, pentacanic acid, palmitic acid, heptadecanic acid, stearic acid, nonadecanic acid, arachidic acid, isobutyric acid, isovaleric acid, isocaproic acid, ethylbutyric acid, methylvaleric acid, isocaprylic acid, propylvaleric acid, ethylcaproic acid, isocapric acid, tuberculostearic acid, pivalic acid, 2,2-dimethylbutanic acid, 2,2-dimethylpentanic acid, 2,2-dimethylhexanic acid, 2,2-dimethylheptanic acid, 2,2-dimethyloctanic acid, 2-methyl-2-ethylbutanic acid, 2-methyl-2-ethylpentanic acid, 2-methyl-2-ethylhexanic acid, 2-methyl-2-propylpentanic acid, 2-methyl-2-propylhexanic acid, 2-methyl-2-propylheptanic acid, acrylic acid, crotonic acid, isocrotonic acid, 3-butenic acid, pentenic acid, hexenic acid, heptenic acid, octenic acid, nonenic acid, decenic acid, undecenic acid, dodecinic acid, tuzuic acid, physteric acid, palmitoleic acid, petroselinic acid, oleic acid, elaidic acid, vaccenic acid, gadoleic acid, methacrylic acid, 3-methylcrotonic acid, tiglic acid, methylpentenic acid, cyclopentacarboxylic acid, cyclohexanecarboxylic acid, phenylacetic acid, chloroacetic acid, glycolic acid, lactic acid, polyalkyl or polyalkenyl succinic ester acid, amide acid, imide acid. Also useful are aliphatic polycarboxylic acids such as citric acid, malonic acid, succinic acid, glutaric acid, adipic acid, pimelic acid, suberic acid, azelaic acid, sebacic acid, undecane diacid, dodecane di-acid, tridecane diacid, tetradecane diacid, pentadecane di-acid, hexadecane diacid, heptadecane diacid, octadecane diacid, nonadecane diacid, eicosane diacid, methylmalonic acid, ethylmalonic acid, propylmalonic acid, butylmalonic acid, pentylmalonic acid, hexylmalonic acid, dimethylmalonic acid, methylethylmalonic acid, diethylmalonic acid, methylpropylmalonic acid, methylbutylmalonic acid, ethylpropyl-malonic acid, dipropylmalonic acid, ethylbutylmalonic acid, propylbutylmalonic acid, dibutylmalonic acid, methylsuccinic acid, ethylsuccinic acid, 2,2-dimethylsuccinic acid, 2,3-dimethylsuccinic acid, 2-methylglutaric acid, maleic acid, citraconic acid, itaconic acid, methyleneglutaric acid, monomethyl maleate, 1,5-octanedicarboxylic acid, 5,6-decane-dicarboxylic acid, 1,7-decanedicarboxylic acid, 4,6-dimeth-yl-4-non-ene-1,2-dicarboxylic acid, 4,6-dimethyl-1,2-nonane-dicarboxylic acid, 1,7-dodecanedicarboxylic acid, 5-ethyl-1,10-decanedicarboxylic acid, 6-methyl-6-dodecene-1,12-dicarboxylic acid, 6-methyl-1,12-dodecanedicarboxylic acid, 6-ethylene-1,12-dodecanedicarboxylic acid, 7-methyl-7-tetra-decene-1,14-dicarboxylic acid, 7-methyl-1,14-tetradecanedicarboxylic acid, 3-hexyl-4-decene-1,2-dicarboxylic acid, 3-hexyl-1,12-decanedicarboxylic acid, 6-ethylene-9-hexadecene-1,16-dicarboxylic acid, 6-ethyl-1,16-hexadecanedicarboxylic acid, 6-phenyl-1,12-dodecanedicarboxylic acid, 7,12-dimethyl-7,1-octadecanediene-1,18-dicarboxylic acid, 7,12-dimeth-yl-1,18-octadecanedicarboxylic acid, 6,8-diphenyl-1,14-tetradecanedicarboxylic acid, 1,1-cyclopentanedicarboxylic acid, 1,1-cyclopentanedicarboxylic acid, 1,2-cyclopentanedicarboxylic acid, 1,1-cyclohexanedicarboxylic acid, 1,2-cyclohexanedicarboxylic acid, 4-cyclohexene-1,2-dicarboxylic acid, 5-nobornene-2,3-dicarboxylic acid, malic acid, glutamic acid, tartaric acid, and polyalkyl or polyalkenyl succinic diacids. Phenols which may be used include, but are not limited to [beta]-naphthol, o-nitrophenol, p-nitrophenol, p-aminophenol, catechol, resorcinol, 4,4'-dihydroxydiphenyl-2,2-propane C1-C20-alkyl phenols, and polyalkyl phenols or substituted Mannich bases.

In a third example of suitable quaternary ammonium salt, the fuel performance additives herein may include a quaternary ammonium salt obtained by reacting a tertiary amine of the Formula IV above with a carboxylic acid containing from 1 to 54 carbon atoms and a quaternizing agent to provide an alkoxylated quaternary ammonium salt. The reaction may be conducted in the presence of a protonating agent having an acid disassociation constant (pKa) of less than about 13, such as a carboxylic acid or an alkyl phenol. The alkoxylated quaternary ammonium salt may also be derived from an amido amine and a quarternizing agent in the presence of a protonating agent. The protonating agent may be obtained from a carboxylic acid, alkyl phenol or from the amido amine derived from a fatty acid wherein the reaction product containing the amido amine has an acid number ranging from about 1 to about 200 mg KOH/g. Regardless of how the alkoxylated quaternary ammonium salt is made, one feature of the disclosure is that the amine contains at least one tertiary amino group and the amido amine is made in a reaction medium that is substantially devoid of an acylating agent.

As used herein the term "substantially devoid of an acylating agent" means that the reaction product is made in the absence or substantial absence of a reaction product of a long chain hydrocarbon, generally a polyolefin substituted with a monounsaturated carboxylic acid reactant such as (i) α,β-monounsaturated $C_4$ to $C_{10}$ dicarboxylic acid such as fumaric acid, itaconic acid, maleic acid; (ii) derivatives of (i) such as anhydrides or $C_1$ to $C_5$ alcohol derived mono- or di-esters of (i); (iii) α,β-monounsaturated $C_3$ to $C_{10}$ monocarboxylic acid such as acrylic acid and methacrylic acid; or (iv) derivatives of (iii) such as $C_1$ to $C_5$ alcohol derived esters of (iii) with any compound containing an olefinic bond represented by the general Formula VIII

$(R^4)(R^5)C=C(R^6)(CH(R^7)(R^8))$             (Formula VIII)

wherein each of $R^4$ and $R^5$ in Formula VIII is, independently, hydrogen or a hydrocarbon based group. Each of $R^6$, $R^7$ and $R^8$ is in Formula VIII, independently, hydrogen or a hydrocarbon based group; preferably at least one is a hydrocarbon based group containing at least 20 carbon atoms.

In one embodiment of this third exemplary quaternary ammonium salt, a tertiary amine including diamines and polyamines may be reacted with a $C_1$ to $C_{54}$ carboxylic acid to form an amido amine and the amido amine may be subsequently reacted with a quaternizing agent. Suitable tertiary amido amine compounds of the Formula VII above wherein each of $R^{10}$, and $R^{11}$ of Formula VII is selected from hydrocarbyl groups containing from 1 to 50 carbon atoms, each $R^9$, $R^{12}$, $R^{13}$ and $R^{14}$ of Formula VII may be independently selected from hydrogen or a hydrocarbyl group, the integer x of Formula VII above may range from 1 to 6, y may be 0 or 1, z may be 1 to 6, and n may range from 1 to 6. Each hydrocarbyl group $R^9$ to $R^{14}$ of Formula VII may independently be linear, branched, substituted, cyclic, saturated, unsaturated, or contain one or more hetero atoms. Suitable hydrocarbyl groups may include, but are not limited to alkyl groups, aryl groups, alkylaryl groups, arylalkyl groups, alkoxy groups, aryloxy groups, amino groups, and the like. Particularly suitable hydrocarbyl groups may be linear or branched alkyl groups. A representative example of an amine reactant which may be amidized and quaternized to yield compounds disclosed herein include for example, but are not limited to, dimethyl amino propyl amine.

If the amine contains solely primary or secondary amino groups, it may be desirable to alkylate at least one of the primary or secondary amino groups to a tertiary amino group prior to quaternizing the amido amine. In one embodiment, alkylation of primary amines and secondary amines or mixtures with tertiary amines may be exhaustively or partially alkylated to a tertiary amine and further alkoxylated to a quaternary salt.

When the amine has a primary or secondary amine group, the amine may be converted to an amido amine by reacting the amine with a $C_1$ to $C_{54}$ carboxylic acid. The acid may be a monoacid, a dimer acid, or a trimer acid. The acid may be selected from the group consisting of formic acid, acetic acid, propionic acid, butyric acid, caprylic acid, capric acid, lauric acid, myristic acid, palmitic acid, stearic, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, .alpha.-linolenic acid, arachidonic acid, eicosapentaenoic acid, erucic acid, docosahexaenoic acid, and the dimer and trimer acids thereof. When reacted with the amine, the reaction product may be a $C_1$-$C_{54}$-alkyl or alkenyl-substituted amido amine such as a $C_1$-$C_{54}$-alkyl or alkenyl-substituted amido propyldimethylamine.

A suitable quaternizing agent for the third quaternary ammonium salt example may be selected from the group consisting hydrocarbyl epoxides of the Formula IX

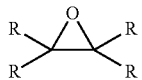

(Formula IX)

wherein each R in Formula IX is independently selected from H and a $C_1$ to $C_{50}$ hydrocarbyl group, and polyepoxides. Non-limiting examples of suitable epoxides that may be used as quaternizing agents may be selected from the group consisting of: 1,3-Butadiene diepoxide Cyclohexene oxide Cyclopentene oxide Dicyclopentadiene dioxide 1,2,5,6-Diepoxycyclooctane 1,2,7,8-Diepoxyoctane 1,2-Epoxybutane cis-2,3-Epoxybutane 3,4-Epoxy-1-butene 3,4-Epoxycyclohexylmethyl 3,4-epoxycyclohexanecarboxylate 1,2-Epoxydodecane 1,2-Epoxyhexadecane 1,2-Epoxyhexane 1,2-Epoxy-5-hexene 1,2-Epoxy-2-methylpropane exo-2,3-Epoxynorbornane 1,2-Epoxyoctane 1,2-Epoxypentane 1,2-Epoxy-3-phenoxypropane (2,3-Epoxypropyl)benzene N-(2,3-Epoxypropyl)phthalimide 1,2-Epoxytetradecane exo-3,6-Epoxy-1,2,3,6-tetrahydrophthalic anhydride 3,4-Epoxytetrahydrothiophene-1,1-dioxide Isophorone oxide Methyl-1,2-cyclopentene oxide 2-Methyl-2-vinyloxirane .alpha.-Pinene oxide Ethylene oxide (.+−.)-propylene oxide Polyisobutene oxide cis-Stilbene oxide Styrene oxide Tetracyanoethylene oxide Tris(2,3-epoxypropyl) isocyanurate and combinations of two or more of the foregoing.

The quaternary ammonium salts from amido amines may be made in one stage or two stages. The reaction may be carried out by contacting and mixing the amido amine with the olefin oxide in the reaction vessel wherein a carboxylic acid is added to the reaction mixture to provide a protonating agent. The carboxylic acid may be same acid used to make the amido amine or may be selected from any of the above listed fatty acids, formic acid, acetic acid, propionic acid, butyric acid, polymeric acid and mixtures thereof, such a polyolefinic mono- or di-carboxylic acid, polymeric polyacids and mixtures thereof, and the like. When used, the mole ratio of protonating agent per mole of epoxy equivalents added to the reaction mixture may range from about 0.5:10, for example from about 2:5, or from abut 1:2 to about 2:1 moles of acid per mole of epoxy equivalents. In one embodiment, the anion of the quaternary ammonium salt is a carboxylate anion.

The reaction may be carried out at temperature ranging from about 30° to about 90° C., for example from about 45° to about 70° C. The reaction may be conducted by reacting any amount of tertiary amino groups to epoxy groups sufficient to provide a quaternary ammonium compound. In one embodiment a mole ratio of tertiary amino groups to epoxy groups may range from about 2:1 to about 1:2. When the amine component has an acid number ranging from about 1 to about 200 mgKOH/g, the reaction medium may include from about 0.5 moles to about 2.0 moles of carboxylic acid per mole equivalent of epoxide. When the reaction is completed volatiles and unreacted reagents may be removed from the reaction product by heating the reaction product under vacuum. The product may be diluted with mineral oil, diesel fuel, kerosene, or an inert hydrocarbon solvent to prevent the product from being too viscous, if necessary.

While the above described quaternary ammonium salt examples are provides, the fuel performance additives and demulsifier blends discussed herein also provide improved demulsification in the presence of other quaternary ammonium salt additives.

Other Components of the Fuel Performance Additive

The fuel performance additives and fuels including such additives may also include one or more optional components as needed for a particular application. For example, the additives and/or fuels may contain conventional quantities of cetane improvers, octane improvers, corrosion inhibitors, cold flow improvers (CFPP additive), pour point, depressants, solvents, demulsifiers, lubricity additives, friction modifiers, amine stabilizers, combustion improvers, detergents, dispersants, antioxidants, heat stabilizers, conductivity improvers, metal deactivators, marker dyes, organic nitrate ignition accelerators, cycloaromatic manganese tricarbonyl compounds, carrier fluids, and the like. In some aspects, the compositions described herein may contain about 10 weight percent or less, or in other aspects, about 5 weight percent or less, based on the total weight of the additive concentrate, of one or more of the above additives. Similarly, the fuels may contain suitable amounts of conventional fuel blending components such as methanol, ethanol, dialkyl ethers, 2-ethylhexanol, and the like.

In some aspects of the disclosed embodiments, organic nitrate ignition accelerators that include aliphatic or cycloaliphatic nitrates in which the aliphatic or cycloaliphatic group is saturated, and that contain up to about 12 carbons may be used. Examples of organic nitrate ignition accelerators that may be used are methyl nitrate, ethyl nitrate, propyl nitrate, isopropyl nitrate, allyl nitrate, butyl nitrate, isobutyl nitrate, sec-butyl nitrate, tert-butyl nitrate, amyl nitrate, isoamyl nitrate, 2-amyl nitrate, 3-amyl nitrate, hexyl nitrate, heptyl nitrate, 2-heptyl nitrate, octyl nitrate, isooctyl nitrate, 2-ethylhexyl nitrate, nonyl nitrate, decyl nitrate, undecyl nitrate, dodecyl nitrate, cyclopentyl nitrate, cyclohexyl nitrate, methylcyclohexyl nitrate, cyclododecyl nitrate, 2-ethoxyethyl nitrate, 2-(2-ethoxyethoxy)ethyl nitrate, tetrahydrofuranyl nitrate, and the like. Mixtures of such materials may also be used.

Examples of suitable optional metal deactivators useful in the compositions of the present application are disclosed in U.S. Pat. No. 4,482,357, the disclosure of which is herein incorporated by reference in its entirety. Such metal deactivators include, for example, salicylidene-o-aminophenol, disalicylidene ethylenediamine, disalicylidene propylenediamine, and N,N'-disalicylidene-1,2-diaminopropane.

Suitable optional cycloaromatic manganese tricarbonyl compounds which may be employed in the compositions of the present application include, for example, cyclopentadienyl manganese tricarbonyl, methylcyclopentadienyl manganese tricarbonyl, indenyl manganese tricarbonyl, and ethylcyclopentadienyl manganese tricarbonyl. Yet other examples of suitable cycloaromatic manganese tricarbonyl compounds are disclosed in U.S. Pat. Nos. 5,575,823 and 3,015,668, both of which are incorporated by reference in their entirety.

Other commercially available detergents and/or additives may be used in combination with the reaction products described herein. Such detergents include but are not limited to succinimides, Mannich base detergents, quaternary ammonium compounds, bis-aminotriazole detergents as generally described in U.S. patent application Ser. No. 13/450,638, and a reaction product of a hydrocarbyl substituted dicarboxylic acid, or anhydride and an aminoguanidine, wherein the reaction product has less than one equivalent of amino triazole group per molecule as generally described in U.S. patent application Ser. Nos. 13/240,233 and 13/454,697.

The additives of the present application, including the demulsifier blends as described above, and any optional additives used in formulating the additives and/or fuels of this disclosure may be blended into a base fuel individually or in various sub-combinations. In some embodiments, the additive components of the present application may be blended into the fuel concurrently using an additive concentrate, as this takes advantage of the mutual compatibility and convenience afforded by the combination of ingredients when in the form of an additive concentrate. Also, use of a concentrate may reduce blending time and lessen the possibility of blending errors.

Base Fuels

The fuel performance additives of the present application may be applicable to the operation of diesel, jet, or gasoline fuels. In one approach, the fuel performance additives including the demulsifier blends herein are well suited for diesel or gasoline and, particularly, gasoline. In one embodiment, the fuel is gasoline. In other another embodiment, the fuel is a diesel. The fuels may include any and all middle distillate fuels, diesel fuels, biorenewable fuels, biodiesel fuel, fatty acid alkyl ester, gas-to-liquid (GTL) fuels, gasoline, jet fuel, alcohols, ethers, kerosene, low sulfur fuels, synthetic fuels, such as Fischer-Tropsch fuels, liquid petroleum gas, bunker oils, coal to liquid (CTL) fuels, biomass to liquid (BTL) fuels, high asphaltene fuels, fuels derived from coal (natural, cleaned, and petcoke), genetically engineered biofuels and crops and extracts therefrom, and natural gas. "Biorenewable fuels" as used herein is understood to mean any fuel which is derived from resources other than petroleum. Such resources include, but are not limited to, corn, maize, soybeans and other crops; grasses, such as switchgrass, miscanthus, and hybrid grasses; algae, seaweed, vegetable oils; natural fats; and mixtures thereof. In an aspect, the biorenewable fuel can comprise monohydroxy alcohols, such as those comprising from 1 to about 5 carbon atoms. Non-limiting examples of suitable monohydroxy alcohols include methanol, ethanol, propanol, n-butanol, isobutanol, t-butyl alcohol, amyl alcohol, isoamyl alcohol, and mixtures thereof. Preferred fuels include gasoline fuels.

The fuels and fuel performance additives herein are suitable for use in various internal combustion systems or engines. The systems or engines may include both stationary engines (e.g., engines used in electrical power generation installations, in pumping stations, etc.) and ambulatory engines (e.g., engines used as prime movers in automobiles, trucks, road-grading equipment, military vehicles, etc.). By combustion system or engine herein is meant, internal combustion engines, for example and not by limitation, Atkinson cycle engines, rotary engines, spray guided, wall guided, and the combined wall/spray guided direct injection gasoline ("DIG" or "GDI") engines, turbocharged DIG engines, supercharged DIG engines, homogeneous combustion DIG engines, homogeneous/stratified DIG engines, DIG engines outfitted with piezoinjectors with capability of multiple fuel pulses per injection, DIG engines with EGR, DIG engines with a lean-NOx trap, DIG engines with a lean-NOx catalyst, DIG engines with SN-CR NOx control, DIG engines with exhaust diesel fuel after-injection (post combustion) for NOx control, DIG engines outfitted for flex fuel operation (for example, gasoline, ethanol, methanol, biofuels, synthetic fuels, natural gas, liquefied petroleum gas (LPG), and mixtures thereof.) Also included are conventional and advanced port-fueled internal combustion engines, with and without advanced exhaust after-treatment systems capability, with and without turbochargers, with and without superchargers, with and without combined supercharger/turbocharger, with and without on-board capability to deliver additive for combustion and emissions improvements, and with and without variable valve timing. Further included are gasoline fueled homogeneous charge compression ignition (HCCI) engines, diesel HCCI engines, two-stroke engines, diesel fuel engines, gasoline fuel engines, stationary generators, gasoline and diesel HCCI, supercharged, turbocharged, gasoline and diesel direct injection engines, engines capably of variable valve timing, leanburn engines, engines capable of inactivating cylinders or any other internal combustion engine. Still further examples of combustion systems include any of the above-listed systems combined in a hybrid vehicle with an electric motor.

EXAMPLES

The following examples are illustrative of exemplary embodiments of the disclosure. In these examples, as well as elsewhere in this application, all ratios, parts, and percentages are by weight unless otherwise indicated. It is intended that these examples are being presented for the purpose of illustration only and are not intended to limit the scope of the invention disclosed herein.

Example 1

Demulsibility tests were conducted on comparative and inventive examples as shown in Tables 1 and 2 below to determine how readily the additive composition provided separation between water and fuel. Demulsibility was conducted according to ASTM D-1094. The fuel was a Market E0 91 Octane Gasoline and contained a fully formulated gasoline performance additive containing a quaternary ammonium salt detergent. The relative ratios of components in the fuel is provided in Tables 1A and 1B and the demulsibility testing per D-1094 is provided in table 2.

TABLE 1A

Fuel Compositions

| | Additive Package Ratios | | |
|---|---|---|---|
| | Gasoline Performance Additive Package | Quaternary Ammonium Salt | Demulsifier Component |
| Comparative Example 1 | 31 | 1 | 0.25 |
| Comparative Example 2 | 31 | 1 | 0.25 |
| Comparative Example 3 | 31 | 1 | 0.25 |
| Comparative Example 4 | 31 | 1 | 0.25 |
| Comparative Example 5 | 31 | 1 | 0.25 |
| Comparative Example 6 | 0 | 1 | 0 |
| Comparative Example 7 | 31 | 0 | 0 |
| Inventive Example 1 | 31 | 1 | 0.25 |
| Inventive Example 2 | 31 | 1 | 0.25 |
| Inventive Example 3 | 31 | 1 | 0.25 |

TABLE 1B

| | Demulsifier Component | | | |
|---|---|---|---|---|
| | Demulsifier Component Ratios | | | |
| | Alkoxylated Phenol Formaldehyde Polymer A | Alkoxylated Phenol Formaldehyde Polymer B | Alkoxylated Fatty Acid Polymer | Alkoxylated Polyimine |
| Comparative Example 1 | 0 | 0 | 1 | 0 |
| Comparative Example 2 | 1 | 0 | 1 | 0 |
| Comparative Example 3 | 0 | 1 | 1 | 0 |
| Comparative Example 4 | 0 | 0 | 1 | 1 |
| Comparative Example 5 | 0 | 0 | 0 | 1 |
| Comparative Example 6 | 0 | 0 | 0 | 0 |
| Comparative Example 7 | 0 | 0 | 0 | 0 |
| Inventive Example 1 | 1 | 1 | 1 | 0.3 |
| Inventive Example 2 | 2 | 1 | 1.5 | 0.5 |
| Inventive Example 3 | 1 | 1.25 | 2 | 0.75 |

TABLE 2

| | ASTM D1094 Demulsibility | | |
|---|---|---|---|
| Component | Total Water Recovery | Time to Recover 20 ml | Interface Rating @ 5 minutes |
| Comparative Example 1 | 20 ml | 0:50 | 2 |
| Comparative Example 2 | 18 ml | — | 4 |
| Comparative Example 3 | 20 ml | 1:00 | 2 |
| Comparative Example 4 | 5 ml | — | 4 |
| Comparative Example 5 | 18 ml | — | 4 |
| Comparative Example 6 | 18 ml | — | 3 |
| Comparative Example 7 | 15 ml | — | 4 |
| Inventive Example 1 | 20 ml | 0:30 | 1b |
| Inventive Example 2 | 20 ml | 1:50 | 1b |
| Inventive Example 3 | 20 ml | 1:00 | 1b |

As shown above, only the inventive samples demonstrated the highest interface rating and with the shortest time to recover 20 mls of water. The comparative samples all had poor interface rates or could not recover 20 mls of water.

Example 2

In this Example, the fuel and demulsifier compositions of Table 1A and 1B above were further evaluated for demulsibility per ASTM D-1094 in a Market E0 87 octane gasoline with a fully formulated gasoline performance additive containing a quaternary ammonium salt detergent as set forth in Example 1. The results are provided in Table 3 below.

TABLE 3

| | ASTM D1094 Demulsbility | | |
|---|---|---|---|
| Component | Total Water Recovery | Time to Recover 20 ml | Interface Rating @ 5 minutes |
| Comparative Example 1 | 20 ml | 1:00 | 2 |
| Comparative Example 2 | 5 ml | — | 4 |
| Comparative Example 3 | 20 ml | 2:00 | 1b |
| Comparative Example 4 | 20 ml | 1:00 | 2 |
| Inventive Example 1 | 20 ml | 1:20 | 1b |
| Inventive Example 2 | 20 ml | 1:00 | 1b |
| Inventive Example 3 | 20 ml | 0:45 | 1b |

As with the additives of Example 1, only the inventive samples achieve the highest interface rating combined with the shortest time to recover 20 mls of water. Demulsibility tests were also conducted on the comparative and inventive examples as shown in Table 2 to determine how readily the additive composition provided separation between water and fuel. Demulsibility was conducted according to ASTM D-1094. The fuel was a Market E0 87 Octane Gasoline It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the end-point values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A fuel performance additive comprising:
   (a) a quaternary ammonium salt obtained from the reaction of a nitrogen containing compound having at least a tertiary amino group and a quaternizing agent; and
   (b) a demulsifier component including a blend of (i) at least two alkoxylated phenol formaldehyde polymers including (i-1) a first alkoxylated phenol formaldehyde polymer having a relative solubility number of 18 to 22 and (i-2) a second alkoxylated phenol formaldehyde polymer having a relative solubility number of 12 to 16; (ii) an alkoxylated fatty acid polymer having a relative solubility number of 12 to 16; and (iii) an alkoxylated polyimine polymer having a relative solubility number of less than 10.

2. The fuel performance additive of claim 1, wherein the first alkoxylated phenol formaldehyde polymer is an ethoxylated phenol formaldehyde polymer having about 25 to about 75 moles of ethylene oxide.

3. The fuel performance additive of claim 1, wherein the second alkoxylated phenol formaldehyde polymer is an ethoxylated and propoxylated phenol formaldehyde polymer having about 5 to 30 moles of ethylene oxide and propylene oxide combined.

4. The fuel performance additive of claim 1, wherein the alkoxylated fatty acid polymer is derived from a dimer fatty diacid, a trimer fatty triacid, a dimer fatty diol and/or a trimer fatty triol and at least one alkylene oxide derived groups and has about 5 to about 30 total moles of alkoxylation.

5. The fuel performance additive of claim 1, wherein the alkoxylated polyimine has about 10 to about 50 moles of alkoxylation.

6. The fuel performance additive of claim 1, wherein the demulsifier component includes a blend of about 10 to about 50 weight percent of the first alkoxylated phenol formaldehyde, about 10 to about 50 weight percent of the second alkoxylated phenol formaldehyde polymer, about 10 to about 50 weight percent of the alkoxylated fatty acid polymer, and about 1 to about 15 weight percent of the alkoxylated polyimine.

7. The fuel performance additive of claim 1, further including a weight ratio of the quaternary ammonium salt to the demulsifier component of about 5:1 to about 1:1.

8. The fuel performance additive of claim 1, further including about 45 to about 190 total moles of alkoxylation provided by blend of (i), (ii), and (iii).

9. The fuel performance additive of claim 1, wherein the nitrogen containing compound of the quaternary ammonium salt is the reaction product of a hydrocarbyl-substituted acylating agent and a compound having an oxygen or nitrogen atom capable of condensing with the hydrocarbyl-substituted acylating agent and including the tertiary amino group.

10. The fuel performance additive of claim 9, wherein the nitrogen containing compound is a polyamine including the tertiary amino group and a primary amine, a secondary amine, or combinations thereof.

11. The fuel performance additive of claim 9, wherein the hydrocarbyl-substituted acylating agent is a hydrocarbyl substituted succinic acid, ester, anhydride, mono-acid/mono-ester, or diacid.

12. The fuel performance additive of claim 1, wherein the quaternizing agent is selected from the group consisting of hydrocarbyl substituted carboxylates, carbonates, cyclic carbonates, phenates, epoxides, carbamates, halides, sulfates, sulfites, sulfides, sulfonates, phosphates, phosphonates, salicylates, oxalates, or mixtures thereof.

13. The fuel performance additive of claim 1, wherein the quaternary ammonium salt is a hydrocarbyl soluble quaternary ammonium carboxylate derived from a reaction of a quaternary ammonium carbonate with an organic acid.

14. The fuel performance additive of claim 13, wherein the quaternary ammonium carbonate is formed by reacting a carbonic acid diester with a tertiary amido amine compound.

15. The fuel performance additive of claim 13, wherein the quaternary ammonium carbonate is selected from the group consisting of succinimidoalkyl trialkyl ammonium carbonates, succinamido/succinyl ester ammonium carbonates and amidoalkyl trialkyl ammonium carbonates.

16. The fuel performance additive of claim 13, wherein the organic acid is selected from the group consisting of stearic acid, nonadecanoic acid, arachidic acid, tuberculostearic acid, tuzuic acid, petroselinic acid, oleic acid, elaidic acid, vaccenic acid, gadoleic acid, polyalkyl or polyalkenyl succinic ester acid, amide acid, imide acid, hexadecane diacid, heptadecane diacid, octadecane diacid, noncadecane diacid, eicosane diacid, 3-hexyl-4-decene-1,2-dicarboxylic acid, 3-hexyl-1,12-decanedicarboxylic acid, 6-ethylene-9-hexadecene-1,16-dicarboxylic acid, 6-ethyl-1,16-hexadecanedicarboxylic acid, 6-phenyl-1,12-dodecane dicarboxylic acid, 7,12-dimeth-y-7,1-octadecanediene-1,18-dicarboxylic acid, 7,12-dimeth-yl-1,18-octadecanedicarboxylic acid, 6,8-diphenyl-1,14-tetradecanedicarboxylic acid, and polyalkyl or polyalkenyl succinic diacids.

17. The fuel performance additive of claim 1, wherein the quaternary ammonium salt is derived from an amido amine containing at least one tertiary amino group and an epoxide in the presence of a proton donor selected from a carboxylic acid and an alkyl phenol.

18. The fuel performance additive of claim 17, wherein the amido amine is in a reaction medium substantially devoid of an acylating agent.

19. The fuel performance additive of claim 17, wherein the proton donor is a carboxylic acid selected from the group consisting of fatty acids, formic acid, acetic acid, propionic acid, butyric acid, polyisobutenyl succinic acid, amide/acid, or acid/ester, and polymeric acids, and mixtures thereof.

20. A fuel composition including a major amount of a fuel and a fuel performance additive of claim 1.

21. The fuel composition of claim 20, wherein the fuel is selected from gasoline or diesel.

22. A method of improving the demulsibility of an additive-containing fuel, the method comprising:

combining a major amount of fuel with (a) a quaternary ammonium salt fuel performance additive and (b) a demulsifier component including a blend of (i) at least two alkoxylated phenol formaldehyde polymers including (i-1) a first alkoxylated phenol formaldehyde polymer having a relative solubility number of 18 to 22 and (i-2) a second alkoxylated phenol formaldehyde polymer having a relative solubility number of 12 to 16; (ii) an alkoxylated fatty acid polymer having a relative solubility number of 12 to 16; and (iii) an alkoxylated polyimine polymer having a relative solubility number of less than 10.

23. The method of claim 22, wherein the fuel is selected from gasoline or diesel.

24. The method of claim 22, wherein the improved demulsibility is measured per one of ASTM D1094, ASTM D7451, or combinations thereof.

25. The fuel performance additive of claim 1, wherein the alkoxylated polyimine polymer is obtained from polyalkylene imines reacted with alkylene oxides selected from ethylene oxide, propylene oxide, butylene oxide, styrene oxide, cyclohexane oxide, or combinations thereof.

26. The method of claim 1, wherein the alkoxylated polyimine polymer is obtained from polyalkylene imines reacted with alkylene oxides selected from ethylene oxide, propylene oxide, butylene oxide, styrene oxide, cyclohexane oxide, or combinations thereof.

* * * * *